United States Patent [19]
Osterkorn et al.

[11] 3,945,554
[45] Mar. 23, 1976

[54] ULTRASONIC SOLDERING PROCESS

[75] Inventors: Charles Louis Osterkorn, North Brunswick; Salvatore M. Marino, East Brunswick, both of N.J.

[73] Assignee: Fedders Corporation, Edison, N.J.

[22] Filed: June 12, 1975

[21] Appl. No.: 586,203

[52] U.S. Cl. ............... 228/110; 228/183; 228/232; 228/262
[51] Int. Cl.² ........................................ B23K 1/06
[58] Field of Search ........... 228/110, 111, 183, 232, 228/262; 432/197

[56] References Cited
UNITED STATES PATENTS

| | | | |
|---|---|---|---|
| 2,182,364 | 12/1939 | Smith | 432/197 X |
| 2,417,662 | 3/1947 | Rosales | 228/183 X |
| 3,833,986 | 9/1974 | DeCicco | 228/183 X |

*Primary Examiner*—Al Lawrence Smith
*Assistant Examiner*—K. J. Ramsey
*Attorney, Agent, or Firm*—Ryder, McAulay, Fields, Fisher & Goldstein

[57] ABSTRACT

A series of thin-walled, heat exchange tubes are soldered to return bends of similar materials so as to complete a flow path through the tube bundle by a process which comprises press-fitting the return bends to the tubes, preheating the return bends and portions of the tube adjacent the bends to a temperature, the average of which is approximately the soldering temperature, soaking the preheated portion in a liquid which will equalize the temperature of the various preheated portions, and ultrasonically soldering the return bends to the tubes.

6 Claims, 5 Drawing Figures

ULTRASONIC SOLDERING PROCESS

BACKGROUND OF THE INVENTION

Tube bundles of tubes having high heat-conductivity, such as of aluminum or copper, are well known in the art. For example, such materials are used as heat exchangers in air conditioning units, both for the evaporator section and for the condenser section. Generally, these tube bundles are formed by mounting a plurality of thin-walled tubes, parallel to each other, in two or more support plates. Actual mounting of the tube bundles is via the support plate.

In use, a heat transfer fluid passes through these tubes, generally with a plurality of passes through a single bundle. Thus, the fluid will flow in one direction in one tube, and in a reverse direction through another tube in the bundle. Obviously, under these circumstances, it is required that the tubes be joined together in pairs to allow for this reverse flow. Such joining is accomplished by attaching a reverse bend to a pair of tubes. This is far more economical than taking a single length of tubing and bending it to provide the necessary return bends. Further, bending of the tube is impractical in view of the fins which must be placed on the tube and, further, in view of the fact that normally more than one layer of tubes is employed. The joint formed between the reverse bend and the straight section of tubing must be fluidtight to prevent leakage of the heat transfer fluid which passes through the tubes. A variety of methods have existed in the prior art for accomplishing this joining, including the use of ultrasonic soldering.

Ultrasonic soldering provides a number of advantages over other soldering methods known to the art, as is apparent to those skilled in the art. However, there are problems with ultrasonic soldering, particularly if the two members being soldered to each other are not at the proper temperature. With too low a temperature, it may not be possible to form an acceptable bond. Particularly with ultrasonic soldering, however, if the temperature is too high, there is a great danger of disintegrating the thin-walled tubes in the ultrasonic soldering bath. The prior art has not dealt with these two distinct problems in an economical manner. A preferred method of dealing with the problem is to assure a relatively constant, equal temperature on all parts of the tube assembly, prior to its insertion into the ultrasonic soldering bath.

In the patent to Rosales, U.S. Pat. No. 2,417,662, a method for brazing similar tube bundles is set forth, though that brazing method does not involve an ultrasonic process. Rather, Rosales deals with preheating of the tube bundles, dipping the preheated bundles into a flux to clean the adjacent parts, and then brazing the materials. Rosales assures a constant temperature on the portions of the tube bundle to be brazed in the preheat step. This is not an economical solution.

BRIEF DESCRIPTION OF THE INVENTION

In accordance with the present invention, reverse bends are ultrasonically soldered to parallel tubes in a bundle employing an ultrasonic soldering process. The process comprises the following steps:

1. Fitting the reverse bends onto or into the ends of the parallel, straight tubes. For example, this can be accomplished by press-fitting.

2. Preheating the reverse bends, and the adjacent portions of the straight tubes, to an average temperature at which the assembly is to be soldered.

3. Soaking the preheated portion of the assembly in a liquid which will equalize the temperature of the portions to be soldered.

4. Placing the portions to be soldered into an ultrasonic soldering bath where soldering is completed.

The crux of the present invention is the preheating of the portions to be soldered to an average temperature at which the reverse bends are to be ultrasonically soldered to the straight tubing portions and then soaking the portions to be soldered so as to equalize the temperature. For example, an ultrasonic soldering process on aluminum tubing will generally be carried out at about 775° to 850°F., preferably between 780° and 800°F. Thus, to assure an adequate solder bond and to prevent disintegration of the thin-walled tubing in the ultrasonic soldering bath, the temperature of the assembly to be soldered should be from about 775° to 850°F., and generally within ± 5° of the particular temperature selected, before being placed into the ultrasonic soldering bath. It is, however, uneconomical to preheat the assembly to this temperature.

The portion of the assembly to be soldered can be preheated by any of a variety of means including soaking of that portion in a hot gas, or, more preferably, by flame preheating. The most economical methods of heating the assembly to be soldered, at this point, provide a temperature over the area to be soldered which is particularly non-uniform. For example, one portion of the assembly, after flame preheating, may be at 700°F., while another portion may be 900°F. This variation is generally not important at this stage of the process, though it would become critical in the actual ultrasonic soldering bath.

Thus, according to the present invention, it is important, only, that the average temperature of the various parts of the portion to be soldered approximate the ultimate ultrasonic soldering temperature after preheat. By then soaking this portion in a fluid held at, or very slightly above, the ultrasonic soldering temperature, the temperature of all parts of this portion to be soldered are equalized to the desired temperature and may then be placed in the ultrasonic soldering bath where a good bond is obtained without the danger of disintegration. This combination of steps is far more economical than attempting to obtain such a uniform temperature in the preheating phase.

DETAILED DESCRIPTION OF THE PREFERRED EMBODIMENTS

Figure 1:
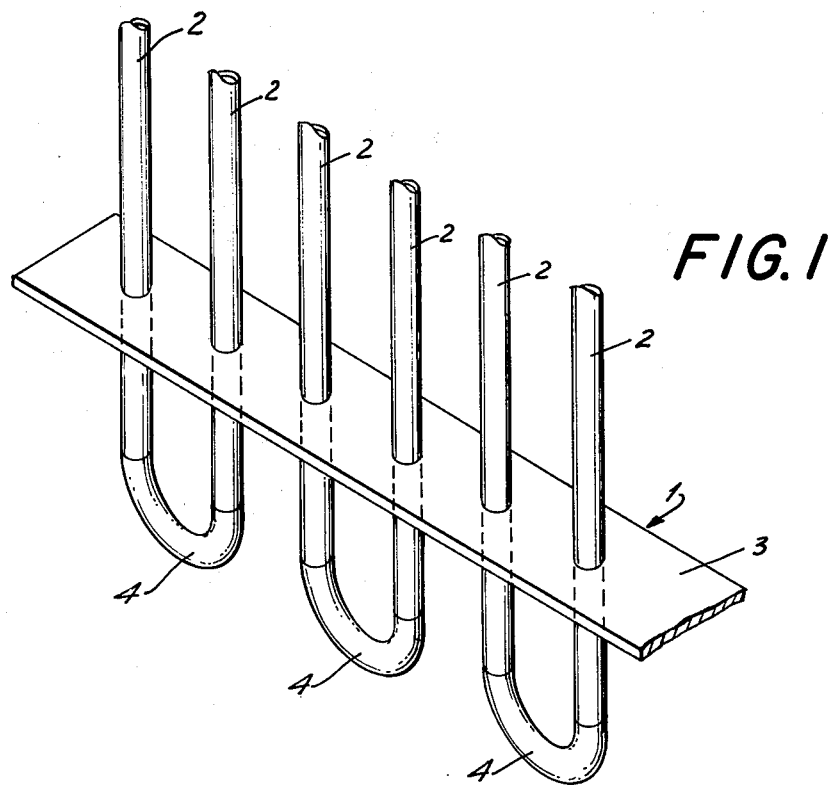
FIG. 1 is a perspective view of several tubes to be soldered, representative of one row of tubes in the layer of tubes which generally comprises the heat exchanger, to which reverse bends have been attached, the tubes being held in parallel relation by a support plate.
Figure 2:
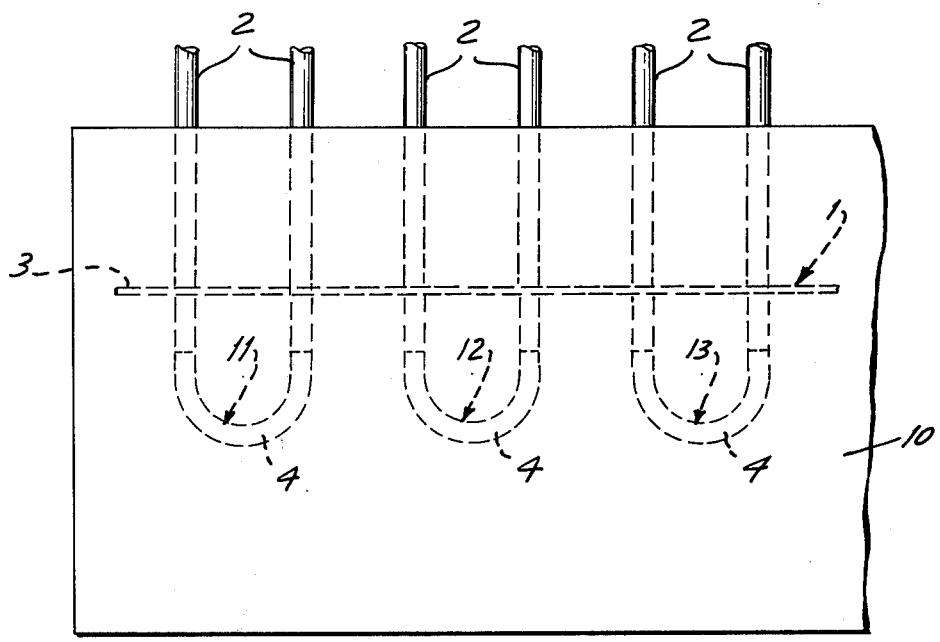
FIG. 2 is a representation of the structure of FIG. 1 being preheated.
Figure 3:
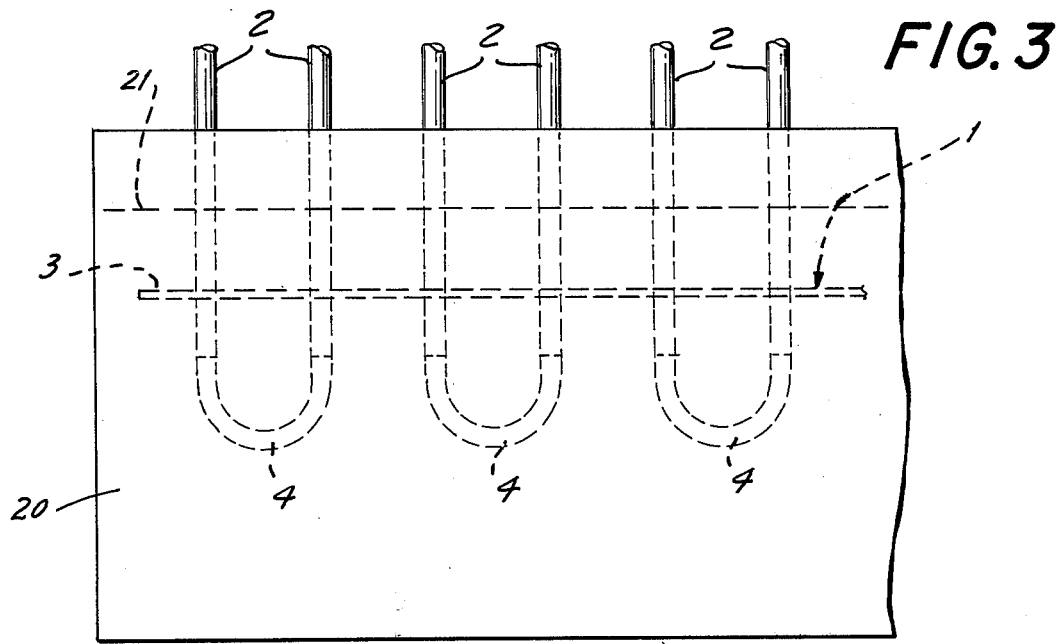
FIG. 3 is a representation of the preheated structure of FIG. 2 where the temperature is equalized on all portions of the structure.
Figure 4:
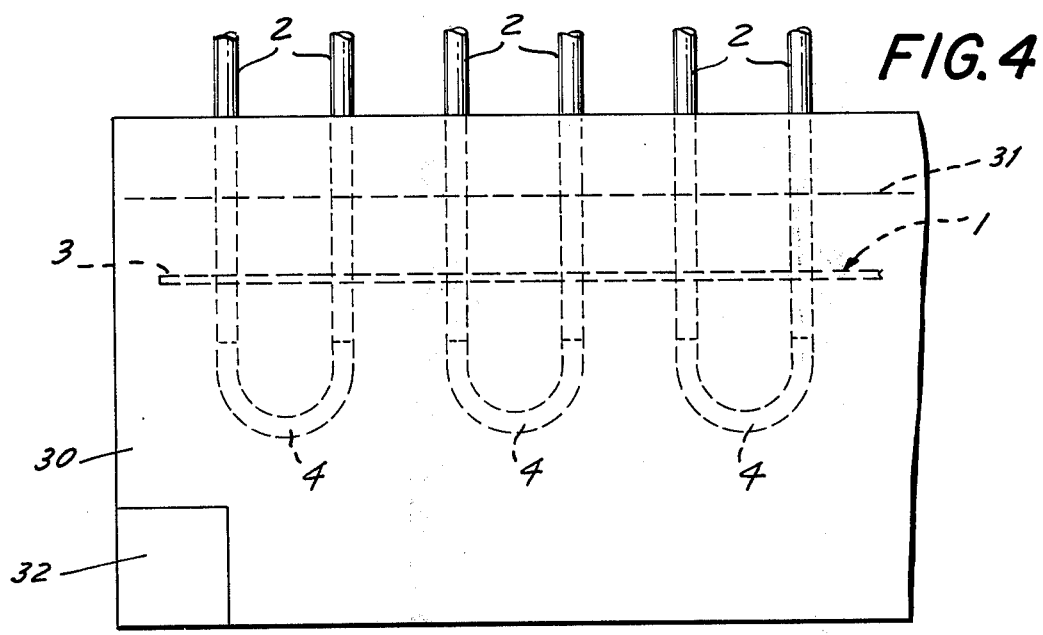
FIG. 4 is a representation of the structure of FIG. 3, after temperature equalization, being ultrasonically soldered.

In accordance with the present invention, and particularly referring to the drawings, a tube bundle is formed from a plurality of thin-walled tubes 2 which are held in parallel relationship by one or more support plates, of which one is represented at 3. In order to provide for a completed tube bundle, the ends of two tubes are joined by reverse bends 4 which are to be soldered in place, onto the ends of the straight tubes 2, the composite forming a tube bundle assembly 1. The assembly 1 is placed into an area 10 where heat is applied as a first step in the soldering process. Any of a variety of methods can be employed for this preheat step, though flame heating is the most preferred, as it is the most economical method. It will be noted that only a portion of the overall assembly 1 is placed in the preheat area. The portion placed into the preheat area is the portion which will be ultrasonically soldered, or is immediately adjacent that portion. No particular purpose would be served by preheating the entire tube bundle assembly and, in fact, preheating of the entire assembly would be uneconomical. In the preheat chamber, the average temperature of the various portions to be soldered is raised to, or slightly above, the temperature at which the ultrasonic soldering is to be carried out. However, this does not mean that each part of the tube assembly which is to be soldered is raised to this temperature. There may be as much as a 200°F. variation between different portions. For example, section 11 may be preheated to about 700°F., section 12 to about 800°F., and section 13 to about 900°F. However, the average temperature of sections 11, 12, and 13 will be at, or slightly above, the ultimate, ultrasonic soldering temperature. From the preheat section 10 shown in FIG. 2, the tube bundle assembly 1 is moved to a temperature equalization chamber 20. This chamber is filled to a level indicated at 21 with a heat-conducting liquid, capable of withstanding the temperatures to which the assembly 1 has been preheated, so long as the liquid has no chemical effect upon the tubes at this temperature. For example, materials such as Dowtherm A or C, various inorganic salts, and certain metals can be used. A preferred material is molten 95–5 zinc-aluminum alloy. The tube bundle assembly 1 is left in structure 20 for a sufficient period of time to assure that the temperature of all sections of the tube assembly 1 are at, or within only a few degrees above, the temperature to be encountered in the ultrasonic soldering bath. The tube bundle assembly 1 is then moved, protecting it from heat loss, to ultrasonic soldering bath 30, illustrated in FIG. 4. A bath of soldering material in the bath 30 is maintained at level 31 so as to provide a sufficient depth of the solder to accomplish joining of the straight tubes 2 and return bends 4. The ultrasonic bath 30 is also provided with an ultrasonic generator, illustrated schematically at 32, to accomplish soldering of the return bends 4 to the straight tubes 2.

Figure 5:
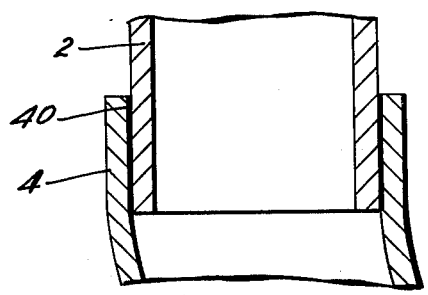
FIG. 5 shows a solder bond formed between a straight tube and a portion of a reverse bend, according to the present invention.

Upon removal of the tube bundle assembly 1 from the ultrasonic soldering bath 30, a completed solder joint will have been formed between tube 2 and return bend 4 as illustrated by 40 in FIG. 5.

Employing the process of the present invention, there is an assurance of obtaining a firm, adequate bond between the return bends of a tube bundle and the straight tube sections of that bundle, without the danger of destruction of the tubes due to localized overheating under the effect of ultrasonic wave generation.

The present process has been described with regard to three treating areas, a preheat area, an equalization area, and an ultrasonic soldering area. It is possible, however, to employ a single treating area for both the equalization and ultrasonic soldering steps. In such a system, the ultrasonic generating unit is not turned on during the equalization step. While this method can be used, it is generally not as economical as the three-treatment-area process specifically shown.

While specific embodiments have been shown and described, the invention should not be considered as so limited, but only as limited by the appended claims.

We claim:

1. A process for ultrasonically soldering thin-wall metal tube bundles consisting of straight tubular sections and return tubular sections, the method comprising:
   a. fitting said return bends to said straight tubes;
   b. preheating the return bends and adjacent portions of the straight tubes to an average temperature approximating the temperature to be employed in ultrasonic soldering;
   c. soaking said preheated tube bundle portion in a heat transfer liquid so as to equalize the temperature of said portion; and
   d. ultrasonically soldering said return bends to said straight tube sections.

2. The process of claim 1 wherein the ultrasonic soldering temperature is from 775° to 850°F.

3. The process of claim 2 wherein the ultrasonic soldering temperature is from 780° to 800°F.

4. The process of claim 1 wherein the variations of temperature in the preheating step are from 700° to 900°F.

5. The process of claim 1 wherein the preheating step is carried out with flame heat.

6. The process of claim 1 wherein the heat transfer liquid is a zinc-aluminum alloy.

* * * * *